(12) United States Patent
Dyer et al.

(10) Patent No.: US 10,777,962 B2
(45) Date of Patent: Sep. 15, 2020

(54) POLARISATION AND MODE SELECTION TECHNIQUE FOR A LASER

(71) Applicant: Rofin-Sinar UK Ltd, Kingston upon Hull (GB)

(72) Inventors: Peter Edward Dyer, Hull (GB); Jason Robert Lee, Hull (GB); Gavin Alan James Markillie, East Riding of Yorkshire (GB)

(73) Assignee: LUXINAR LTD. (GB)

( * ) Notice: Subject to any disclaimer, the term of this patent is extended or adjusted under 35 U.S.C. 154(b) by 0 days.

(21) Appl. No.: 16/181,526

(22) Filed: Nov. 6, 2018

(65) Prior Publication Data

US 2019/0157831 A1 May 23, 2019

(30) Foreign Application Priority Data

Nov. 22, 2017 (GB) .................................. 1719402.8

(51) Int. Cl.
*H01S 3/10* (2006.01)
*H01S 3/03* (2006.01)
(Continued)

(52) U.S. Cl.
CPC ........ *H01S 3/10061* (2013.01); *G02B 27/286* (2013.01); *H01S 3/034* (2013.01); *H01S 3/0315* (2013.01); *H01S 3/08018* (2013.01); *H01S 3/08054* (2013.01); *H01S 3/0305* (2013.01); *H01S 3/038* (2013.01); *H01S 3/0388* (2013.01); *H01S 3/08045* (2013.01);
(Continued)

(58) Field of Classification Search
CPC .......... H01S 3/22–227; H01S 3/10061; H01S 3/1308
See application file for complete search history.

(56) References Cited

U.S. PATENT DOCUMENTS 4,169,251 A 9/1979 Laakmann
4,359,260 A 11/1982 Reinhart et al.
(Continued)

FOREIGN PATENT DOCUMENTS

| GB | 2477106 A | 7/2011 |
|----|-----------|--------|
| WO | WO 2005/070160 A2 | 8/2005 |
| WO | WO 2009/017585 A1 | 2/2009 |

OTHER PUBLICATIONS

Hill, C. and Hall, D.; Coupling Loss Theory of Single-Mode Waveguide Resonators; Applied Optics, May 1, 1985; p. 1293-1290; vol. 24, No. 9; Optical Society of America.
(Continued)

*Primary Examiner* — Tod T Van Roy
*Assistant Examiner* — Sean P Hagan
(74) *Attorney, Agent, or Firm* — Law Office of Jesse D. Lambert, LLC (57) ABSTRACT

A polarisation and mode selection technique for a gas waveguide laser is described in which a surface of the waveguide is formed to be substantially dielectric with a localised metallic region therein. The metallic region provides linear polarisation while the dielectric surface provides for low order mode selection. Embodiments are described to channel and planar waveguides with various resonator configurations. Ranges are provided for the size and location of the metallic region on the waveguide surface.

18 Claims, 6 Drawing Sheets

(51) Int. Cl.
*H01S 3/08* (2006.01)
*H01S 3/038* (2006.01)
*H01S 3/0971* (2006.01)
*H01S 3/223* (2006.01)
*H01S 3/034* (2006.01)
*G02B 27/28* (2006.01)

(52) U.S. Cl.
CPC ......... *H01S 3/08081* (2013.01); *H01S 3/0971* (2013.01); *H01S 3/2232* (2013.01)

(56) References Cited

U.S. PATENT DOCUMENTS

| | | | |
|---|---|---|---|
| 4,363,126 A | | 12/1982 | Chenausky et al. |
| 4,577,323 A | | 3/1986 | Newman et al. |
| 4,719,639 A | | 1/1988 | Tulip |
| 4,787,090 A | | 11/1988 | Newman et al. |
| 5,172,389 A | * | 12/1992 | Horiuchi ............... H01S 3/0387 372/61 |
| 5,216,689 A | | 6/1993 | Gardner et al. |
| 5,283,797 A | | 2/1994 | Mefferd |
| 5,335,242 A | | 8/1994 | Hobart et al. |
| 5,373,528 A | * | 12/1994 | Kuzumoto ............ H01S 3/0315 372/35 |
| 6,810,061 B2 | * | 10/2004 | Hori ........................ H01S 3/038 372/87 |
| 8,009,716 B2 | | 8/2011 | Markillie et al. |
| 8,295,319 B2 | | 10/2012 | Morrow et al. |
| 8,913,642 B2 | * | 12/2014 | Engel ..................... H01S 3/0315 372/55 |
| 2002/0167974 A1 | * | 11/2002 | Kennedy ............... H01S 3/2232 372/10 |
| 2007/0165992 A1 | | 7/2007 | Mouli |
| 2012/0236897 A1 | | 9/2012 | Hage et al. |
| 2016/0233640 A1 | * | 8/2016 | Morrow ................ H01S 3/0816 |

OTHER PUBLICATIONS

Cao, Q., Baker, H., and Hall, D.; Transverse Mode Propagation and Gain Coefficients . . . ; IEEE Journal of Quantum Mechanics, Mar. 2001; p. 376-383; vol. 37, No. 3; IEEE.

Khelkhal, M. and Herlemont, F.; Effective Optical Constants of Alumina . . . ; J. Optics (Paris), 1992; p. 225-228; vol. 23, No. 6; Paris.

Ordal, M. et al; Optical Properties of the Metals . . . ; Applied Optics, Apr. 1, 1983; p. 1099-1120; vol. 22, No. 7; Optical Society of America.

Villareal, F. et al; High Gain and High Peak Power . . . ; presentation at Pacific Rim Conference on Lasers and Electro-Optics, Jul. 15-19, 2001; p. 1-30; CLEO.

Laakmann, K. and Steier, W.; Waveguides: Characteristic Modes of Hollow Rectangular . . . ; Applied Optics, May 1976; p. 1334-1340; vol. 15, No. 5; Optical Society of America.

Seigman, A.; Lasers; 1986; p. 826-827.

* cited by examiner

POLARISATION AND MODE SELECTION TECHNIQUE FOR A LASER

BACKGROUND OF THE INVENTION

The present invention relates to a combined polarisation and mode selection technique in a laser and more particularly, though not exclusively, to a gas waveguide laser in which a dielectric surface of the waveguide has a localised metal region located therein. The position and size of the metal region can be varied to provide polarisation and mode selection.

Gas waveguide lasers are the typical choice for many industrial laser processing systems. The laser comprises: first and second surfaces separated to form a waveguide on a first axis between the surfaces; a discharge region contained within at least a portion of the waveguide; and, a resonant cavity having a beam propagation axis orthogonal to the first axis. When only two surfaces are present waveguiding occurs in one dimension on the first axis and the surfaces have a width adequate to allow free-space propagation in the axis orthogonal to the first and propagation axes. This is referred to as a planar waveguide and forms a slab laser. Third and fourth surfaces may be present on a second axis perpendicular to both the first axis and the propagation axis. The distance between the first and second surfaces is typically 1 mm to 3 mm for waveguiding. If the distance between the third and fourth surfaces is greater than 10 times that of the distance between the first and second then this is a planar waveguide. When the third and fourth surfaces are 1 mm to 3 mm apart waveguiding of the light occurs along both dimensions. This is referred to as a channel waveguide.

For a typical planar waveguide the first and second surfaces are metal surfaces such as aluminium. Where third and fourth surfaces are present these will be a dielectric such as alumina. Alternatively, all surfaces may be dielectric guiding surfaces. This may be by application of dielectric on a metallic substrate for the first and second surfaces. In channel waveguides, typical arrangements are for all dielectric surfaces or first and second metallic with third and fourth dielectric. Equally dielectric guiding layers may be formed on metallic substrates. In the prior art each surface over which a discharge is created for waveguiding is typically either entirely metallic or entirely dielectric.

It is known that there exist different mode and polarisation properties for light guided by metallic surfaces as compared to those guided by dielectric surfaces. Alumina guiding surfaces provide better mode selection properties to aluminium surfaces. However, for polarisation selection metallic waveguide surfaces are far superior to dielectric waveguide surfaces.

Along with a low-order mode, a polarisation that is both stable and linear is a necessity for many industrial laser processing systems. In the cutting of thick (>5 mm) steels laser absorption into the side walls of the cut as it penetrates deeper into the material becomes increasingly significant. Since the cut angle is near Brewster's angle the absorption is highly polarisation dependent. To prevent an inconsistency in cut edge quality and machining speeds along orthogonal cut directions, the linear polarisation output of the laser is transformed to circular polarisation using a simple quarter waveplate. If the polarisation from the laser was not linear and stable, the transformed polarisation would be inconsistent and the cut quality and depth would be highly variable. During laser processing of reflective media, particularly metals, a large fraction of the laser light is reflected. This back reflected light can be directed into the laser causing significant variations in the laser output and, in the most extreme cases, damage to optical components within the laser resonator. A linearly polarised output from the laser can be prevented from re-entering after reflection from the work piece by a back reflection device that rotates the return polarisation and absorbs polarisation along a direction perpendicular to the emission exiting the laser. If the polarisation was not linear or stable, the back reflection device would be damaged thereby no longer preventing the back reflected light re-entering the laser. Variable polarisation can also pose challenges when installing the laser. Many beam splitters have polarisation dependent reflectivity. Therefore, installations using a single laser source for multiple beams will have unwanted variation in power along each beam path. Finally, optical modulators for deflecting the beam and varying the temporal profile, such as acousto-optical modulators, have strong polarisation dependence preventing effective operation with variable polarisation lasers.

A standard technique for polarising a laser is to place a Brewster plate into the laser cavity. This introduces significantly higher loss for s-polarised radiation compared with p-polarised radiation. However, this is unsuitable for many waveguide lasers with a gaseous active medium. Typically, the resonator mirrors are placed close to the end of the waveguide, the near-case 1 position, to ensure efficient coupling of the light into the waveguide in a compact device. Therefore, there is insufficient space to fit a Brewster plate. Furthermore, in slab lasers the electrode width is typically >25 mm. Since the Brewster plate would need to extend over the entire width of the beam the component would be large and prohibitively expensive.

In the prior art mode selection for metallic electrodes is provided by spacing the resonator mirrors away from the waveguide exit to introduce increased coupling losses from the resonator mirrors to the waveguide for higher order waveguides. Although effective this approach results in clear constraints on resonator design that can limit the available options when optimising waveguide lasers.

BRIEF SUMMARY OF THE INVENTION

It is therefore an object of the present invention to provide a laser which obviates or mitigates at least some of the disadvantages of the prior art.

It is a further object of the present invention to provide a laser which provides combined polarisation and mode selection.

According to a first aspect of the present invention there is provided a laser comprising first and second surfaces separated to form a waveguide on a first axis between said surfaces; a discharge region contained within at least a portion of said waveguide; a resonant cavity having a propagation axis orthogonal to said first axis; and characterised in that the first surface is a substantially dielectric surface including a localised metallic region therein.

In this way, the metallic region influences the polarisation while the dielectric surface influences the mode selection.

Preferably, there is a single metallic region on the first surface. In this way, the mode and polarisation characteristics of the laser can be pre-selected.

Preferably, the metallic region has a length in the propagation axis between 5% and 30% of a length of the first surface along the propagation axis. It has been determined that a metallic surface within a greater area of dielectric surface provides the best mode and polarisation selection.

Preferably, the length of the metallic region $L_M$ is governed by the equation:

$$0.05 \leq \frac{L_M}{L_M + L_{D1} + L_{D2}} \leq 0.3$$

and $L_{D1}$ is a length of dielectric surface on a first side of the metallic region and $L_{D2}$ is a length of dielectric surface on a second side of the metallic region such that $L_M+L_{D1}+L_{D2}$ is the length of the first surface along the propagation axis.

Preferably, the metallic region extends over an entire width of the first surface along a second axis orthogonal to the first and propagation axes. This provides a simpler construction. Alternatively, the metallic region may extend over a portion of the width of the first surface. In this arrangement the metallic region on the first surface is entirely bounded by a dielectric surface.

The metallic region may be located at any position on the first surface along the propagation axis. Preferably, $L_{D1} \neq L_{D2}$. In this way, the metallic region is not symmetrically arranged. The metallic region may be located symmetrically about a focus of the resonator cavity.

Preferably, the metallic region is rectangular in shape on the first surface. This provides for easier machining. The metallic region may comprise a plurality of sections which provide an overall desired length along the propagation axis. Alternatively, the metallic region may be square, circular, elliptical or any other shape which creates the desired polarisation.

There may be a metallic region in the second surface. In this arrangement the metallic regions are preferably the same size and shape, and arranged to lie directly opposite each other in the laser.

Preferably, the height of the waveguide on the first axis is in the range 1 mm to 3 mm. Preferably, the width of the first and second surfaces is greater than ten times the height on the first axis. This provides a strip shaped discharge. It also lends itself to being a slab laser. Advantageously, the height of the waveguide is in the range 1.0 mm to 3.0 mm.

Preferably, the laser has third and fourth surfaces, the third and fourth surfaces being oppositely arranged on the second axis, between and perpendicular to the first and second surfaces. In this way, the discharge is contained within a volume bounded by the first, second, third and fourth surfaces. The third and fourth surfaces may be separated to form a waveguide on the second axis between said third and fourth surfaces. In this way a channel waveguide is provided. Alternatively, the third and fourth surfaces are separated by a distance sufficient to allow free space propagation in the direction of the second axis. In this way a planar waveguide is provided and the laser may be considered as a slab laser.

Preferably, the distance of separation between the third and fourth surfaces matches the height of the waveguide on the first axis. This provides a waveguide laser. Alternatively, the distance of separation between the third and fourth surfaces is greater than ten times the height on the first axis. This provides a strip shaped discharge and a slab laser.

Preferably the resonant cavity comprises two resonator mirrors being a highly reflective rear mirror and an output coupler. The output coupler may be partially reflective and the resonant cavity is arranged around a channel waveguide. In an embodiment the resonant cavity is a positive branch unstable resonator. In a preferred embodiment the resonant cavity is a negative branch unstable resonator arranged around a planar waveguide.

In an embodiment of the present invention, the discharge is an RF excited $CO_2$ laser gas. This provides an opportunity to have a sealed laser.

The laser may be considered as a polarisation and mode selective waveguide gas laser comprising: a resonant cavity having a laser beam propagation axis; first and second surfaces, said surfaces being elongate and spaced apart to form a waveguide having a waveguide height along a first axis extending between said surfaces, said first axis being orthogonal to said surfaces and to said laser beam propagation axis; a discharge region between first and second electrodes, said discharge region being contained within at least a portion of said waveguide to thereby create an output laser beam along said laser beam propagation axis; characterised in that: the first surface is a substantially dielectric surface including a metallic section therein.

According to a second aspect of the present invention there is provided a method of providing a polarisation and mode selective laser, comprising the steps:
a) providing first and second surfaces which can be arranged to form a waveguide therebetween;
b) providing a resonant cavity around said waveguide;
c) creating a gas discharge within at least a portion of said waveguide; characterised in that:
the first surface comprises a substantially dielectric surface including a localised metallic region therein.

Preferably the method includes the step of inserting a machined metallic element into a machined ceramic element to provide the first surface.

The method may include the step of inserting a machined metallic element between two machined ceramic elements to provide the first surface.

The method may include the step of placing a metallic coating in a region on a surface of a ceramic substrate to provide the first surface. Preferably the coating has a thickness in the range of microns.

The method may include the step of placing a dielectric coating on a metallic substrate wherein a region of the metallic substrate includes a mask to prevent coating in the region of the mask. Preferably the coating has a thickness in the range of microns.

Preferably, the metallic region has a length of between 5% and 30% of a length of the first surface along the resonant cavity.

Other features may be as described with respect to the first aspect.

Preferably the laser is an RF excited $CO_2$ slab laser with a negative branch unstable resonator.

BRIEF DESCRIPTION OF THE SEVERAL VIEWS OF THE DRAWINGS

Embodiments of the present invention will now be described, by way of example only, in which:

FIG. 5 is a schematic illustration of a laser including a metallic region in first and second surfaces in (a) a plane orthogonal to the first axis and (b) a plane orthogonal to the second axis according to an embodiment of the present invention;

FIG. 6 is a schematic illustration of a laser including a metallic region in first and second surfaces in (a) a plane orthogonal to the first axis and (b) a plane orthogonal to the second axis according to an embodiment of the present invention;

FIG. 7 is a schematic illustration of a laser including a metallic region in first and second surfaces in (a) a plane orthogonal to the first axis and (b) a plane orthogonal to the second axis according to an embodiment of the present invention;

FIG. 10 is a graph of transmitted power and reflected power against time for the laser of FIG. 7 tested using the arrangement of FIG. 9 when (a) no metallic region is present and (b) when a metallic region is present according an embodiment of the present invention;

FIG. 11 is a plot of beam radius versus position in the (a) first axis and (b) second axis, through the focus of a 1.3 m lens, for the laser of FIG. 7; and FIGS. 12(*a*)-(*c*) are illustrations of methods of forming the first surface in a laser according to embodiments of the present invention.

DETAILED DESCRIPTION OF THE INVENTION

Figure 1:
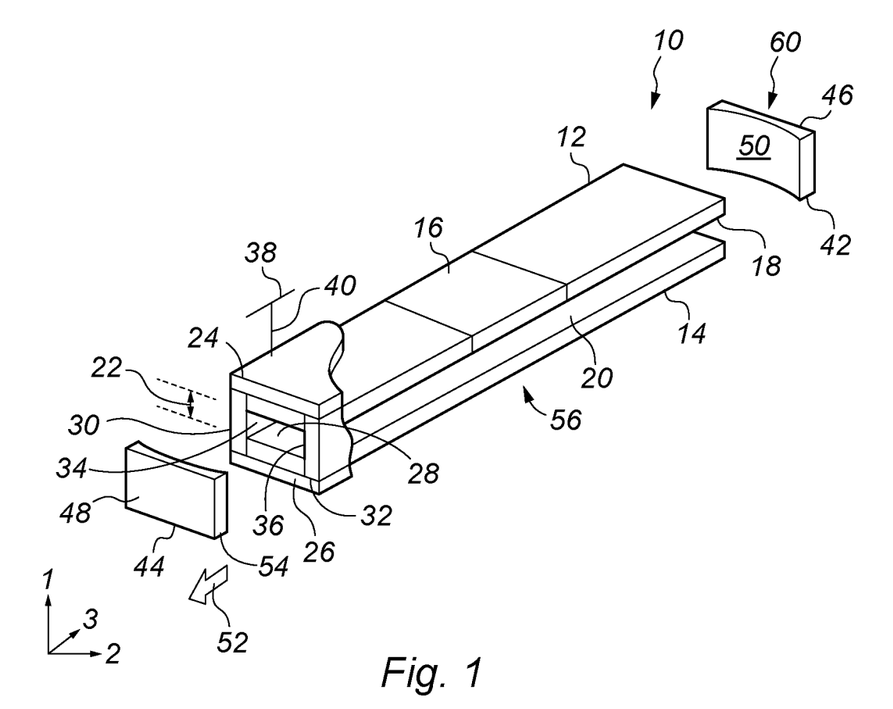
FIG. 1 is a schematic illustration of a polarisation and mode selective laser according to an embodiment of the present invention.

Reference is initially made to FIG. 1 of the drawings which illustrates a mode and polarisation selective laser, generally indicated by reference numeral 10, according to an embodiment of the present invention. Laser 10 comprises a pair of elongate rectangular ceramic plates or slabs 12,14 formed from a dielectric material such as alumina. The bottom plate 14 is entirely constructed of ceramic but the top plate 12 is substantially a dielectric material with a region 16 of a metallic material, formed from a conductive metal such as aluminium, located therein. Each plate 12,14 provides a planar rectangular surface 18,20 and these first and second surfaces 18,20 are parallel and oppositely arranged to face each other and be separated by a distance being a waveguide height 22. Thus a first surface 18 is a substantially dielectric surface including a localised metallic region 16 therein.

The plates 12,14 are spaced apart by a waveguide height 22 being preferably in the range 1.0 mm to 3.0 mm. The plates 12,14 are held apart at the desired height 18 by the inclusion of side plates 30,32 (shown illustratively in part). The side plates 30,32 are parallel walls which provide third and fourth surfaces 34,36 respectively. Those skilled in the art will recognise that the separation of the third and fourth surfaces 34,36 can be equivalent to the waveguide height 22. In this way, the arrangement would be a channel laser waveguide. Where the separation between the third and fourth surfaces 34,36 is greater than ten times the waveguide height 22, the arrangement would be a planar waveguide laser. The first and second surfaces 18,20 can be considered as guiding surfaces in a planar waveguide and the first, second, third and fourth surfaces 18,20,34,36 may therefore be considered as guiding surfaces in a channel waveguide. The metallic region 16 may be located on any guiding surface.

The plates 12,14 are sandwiched between planar electrodes 24,26 (shown illustratively in part) which create a discharge volume 28 between the surfaces 18,20,34,36 and along the entire length of plates 12,14,30,32 to provide the output power of the laser 10. The dielectric plates 12,14 have a selected thickness through which a discharge can be maintained. For a 100w $CO_2$ laser a suitable length for plates 12,14 would be 480 mm with a width of 45 mm. The electrodes 24,26 are typically adapted to include one or more coolant channels (not shown) through which water can flow. The discharge fills the entire discharge volume 28 extending over the entirety of the dielectric and metallic surfaces which bound the volume 28. This volume 28 is defined by the waveguide height 22 on a first axis, the separation between the third and fourth surfaces 34,36 on a second axis, orthogonal to the first axis, and the length of the plates 12,14,30,32 in a propagation direction being along a third axis, orthogonal to the first and second axes. The first, second and third axes are a rectangular coordinate system as illustrated in FIG. 1.

As is known in the art, the electrodes are excited from a radiofrequency, RF, generator 38 which is impedance matched to the electrodes 24,26, via a network 40. The discharge is created by excitation of a laser gas located between the electrodes 24,26 within the volume 28. In the preferred embodiment, the laser gas is a standard $CO_2$ mix of helium, nitrogen, and carbon dioxide in the ratio 3:1:1, with an additional 5% xenon, at a fill pressure of 50 to 300 mbar. The output is at a principal wavelength of 10.6 microns. The arrangement is sealed within a housing (not shown).

At each end 42,44 of the electrodes 24,26, there is arranged a mirror 46,48. This pair of resonant mirrors 46,48 provide the resonant cavity 60 via a highly reflective rear mirror 46 and an output coupler 48. Each mirror 46,48 is fixed to a mount (not shown) which can be made adjustable from outside the housing, if desired. The mirrors 46,48 are typically formed from a silicon or copper substrate which is coated, firstly, with gold or silver, and, secondly, with a dielectric stack of thorium fluoride and zinc sulphide. An additional coating of thorium fluoride or, preferably, germanium is applied. The rear mirror 46 is sized to provide a reflective surface 50, which extends beyond the discharge volume 28, so that all light from the end mirror 46 is reflected back into the region 28. The output coupler 48, is shorter, so that a portion of light 52 is coupled, passed the mirror hard edge 54, out of the resonator cavity 60 as the laser output. Those skilled in the art will recognise that the output coupler 48 could be partially reflective and be of similar size and arrangement to the rear mirror 46, so that the laser output is now through the output coupler 48 on a central optical axis.

Returning to the first surface of dielectric with the metallic region, we now consider the relationship between dimensions of the metallic region required to provide low order mode selection and the selection of linear polarisation.

We first consider the different waveguiding properties of dielectric and metallic surfaces for mode selection. Waveguide loss coefficients for planar waveguides are given in equations (1) and (2) below for TE and TM modes. TE modes have linear polarisation polarised parallel to the guiding surfaces whereas TM modes have polarisation oriented perpendicular to the guiding surface.

$$\alpha_{TE} = \frac{m^2 \lambda^2}{2a^3} \text{Re}\left[\frac{1}{\sqrt{(n-ik)-1}}\right] \quad (1)$$

$$\alpha_{TM} = \frac{m^2 \lambda^2}{2a^3} \text{Re}\left[\frac{(n-ik)^2}{\sqrt{(n-ik)-1}}\right] \quad (2)$$

Here m is the transverse mode order number, $\lambda$ is the wavelength, a is the separation between the guiding surfaces, n is the refractive index and k is the extinction coefficient.

Figure 2:
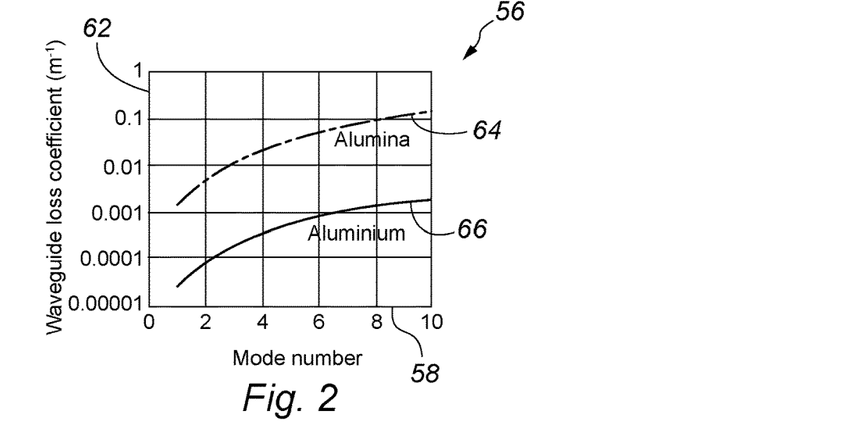
FIG. 2 is a graph of calculated waveguide loss coefficient for TE polarised modes on alumina and aluminium guiding surfaces against mode number in a planar waveguide.

FIG. 2 shows a graph 56 of calculated waveguide loss coefficient 62 against mode number 58 for TE modes on both alumina 64 and aluminium 66 waveguide surfaces for a propagating wavelength of 10.6 μm with a 2 mm gap between the waveguide surfaces 18,20. The calculations used the typical refractive index of 0.67 and extinction coefficient of 0.136 for alumina and a refractive index of 36.6 and extinction coefficient of 111 for aluminium.

By consideration of the fundamental mode (m=1) and the first higher order even mode (m=3) it is clear that alumina guiding surfaces provide superior mode selection properties to aluminium surfaces. In the case of alumina, for m=1 $\alpha_{TE}$~0.0014 m$^{-1}$, ~0.15%-0.3% of the typical small signal gain coefficient ($g_0$) in $CO_2$ gas waveguide lasers of 0.5 m$^{-1}$ to 1.0 m$^{-1}$, whereas for m=3 $\alpha_{TE}$~0.0126 m$^{-1}$, ~1.25%-2.5% of $g_0$. The difference in loss coefficients is sufficient to suppress higher order mode oscillation whilst allowing efficient fundamental mode operation resulting in the high quality mode required for many applications. However, in the case of aluminium guiding surfaces both waveguide loss coefficients are <0.2% of $g_0$ resulting in little, if any mode, selection.

Figure 3:
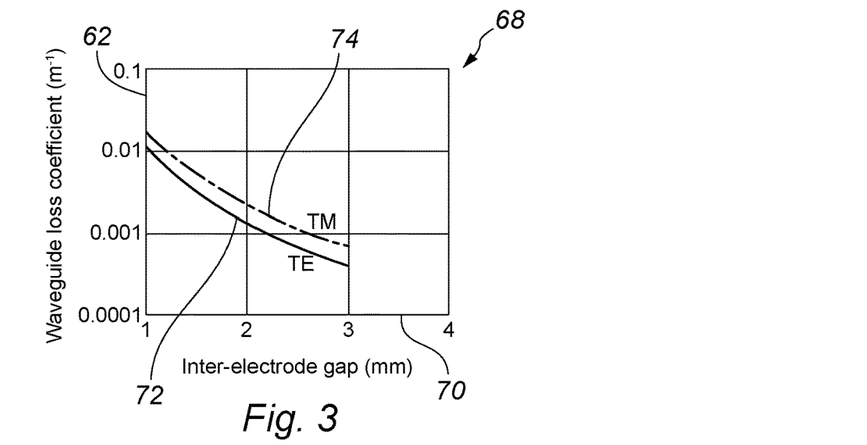
FIG. 3 is a graph of calculated waveguide loss coefficient for TE polarisation and TM polarisation with alumina guiding surfaces against inter-electrode gap in a planar waveguide.

Conversely, metallic waveguide surfaces are far superior to dielectric waveguide surfaces for polarisation selection. FIG. 3 shows a graph 68 displaying calculations for alumina guiding surfaces for the fundamental waveguide, m=1, at a wavelength of 10.6 μm. In this arrangement the guiding surfaces are formed by the electrodes so that the waveguide height 22 is the inter-electrode gap 70. Graph 68 is thus to the waveguide loss coefficient 62 versus the inter-electrode gap 70 calculated for the TE polarisation 72 (parallel to the guiding surface) and TM polarisation 74 (perpendicular to the guiding surface) with alumina guiding surfaces in a planar waveguide laser. At a nominal gap size of 2 mm the loss coefficient for the TE mode is 0.001 m$^{-1}$ and for the TM mode 0.002 m$^{-1}$. Although the TM mode has twice the loss of the TE mode, in both cases the loss coefficient never exceeds ~0.2% of $g_0$. Therefore, the loss coefficients are insufficient to generate preferential laser oscillation on a particular polarisation.

Figure 4:
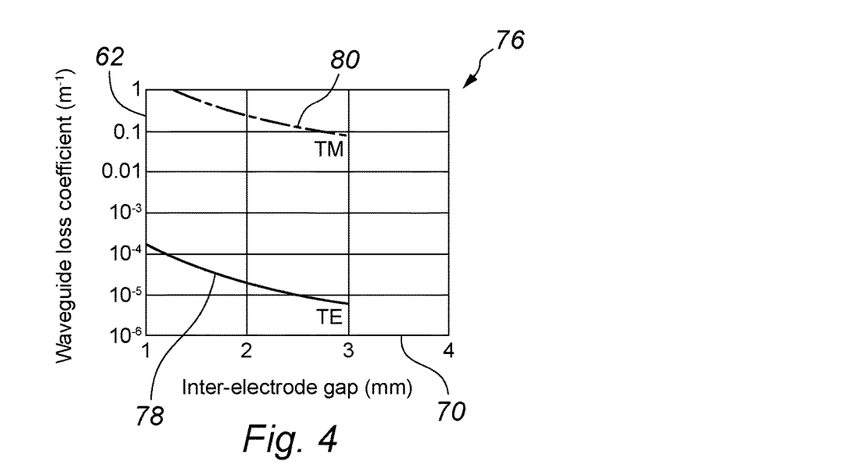
FIG. 4 is a graph of calculated waveguide loss coefficient for TE polarisation and TM polarisation with aluminium guiding surfaces against inter-electrode gap in a planar waveguide.

FIG. 4 shows a corresponding graph to FIG. 3 but now for aluminium guiding surfaces. Graph 76 is thus to the waveguide loss coefficient 62 versus the inter-electrode gap 70 calculated for the TE polarisation 78 (parallel to the guiding surface) and TM polarisation 80 (perpendicular to the guiding surface) with aluminium guiding surfaces in a planar waveguide laser. Evidently, the waveguide loss coefficients are significantly different to those calculated for alumina. For TE modes the loss coefficient is ~0.00002 m$^{-1}$, ~0.002% of the small signal gain coefficient, whereas for TM modes the loss coefficient is ~0.28 m$^{-1}$, 30%-60% of the typical small signal gain coefficient, resulting in strong polarisation selectivity. Similar calculations and conclusions are possible for channel waveguides.

The Applicants have discovered that combining dielectric and metallic materials on a surface can simultaneously create the benefits of mode selection from dielectric surfaces and polarisation selection from metallic surfaces without the constraints on resonator design presented in the prior art.

As illustrated in FIG. 1, the present invention utilises a localised metallic region 16 within a substantially dielectric surface 18 to ensure a linear output polarisation. The metallic region 16 extends only between 5% and 30% of the waveguide surface length along the propagation axis. This low range is possible as the loss for TM modes for a continuous metallic surface is ~10-20× higher than required to ensure oscillation of TE modes only. This is evident by considering the values of loss coefficient for higher order TE modes that are suppressed if the loss is only ~2% of $g_0$. Therefore, by localising the metallic region the polarisation loss can be reduced towards ~2%, sufficient to select the required polarisation, whilst extending the dielectric over ~70%-95% of waveguide propagation length ensures sufficient higher order mode selection.

Figure 5A:
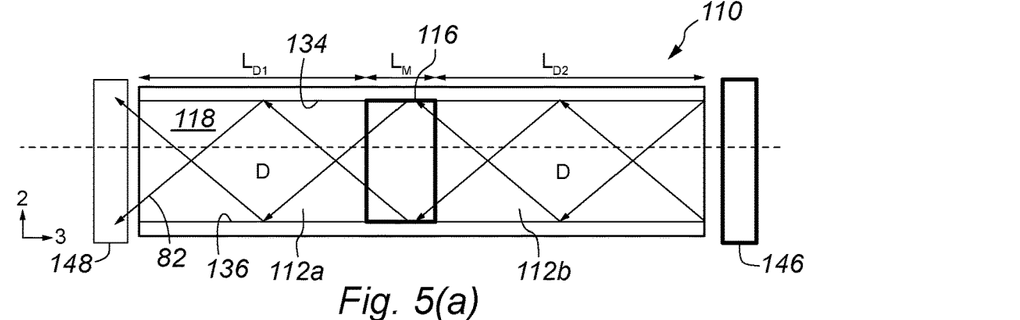
Figure 5B:
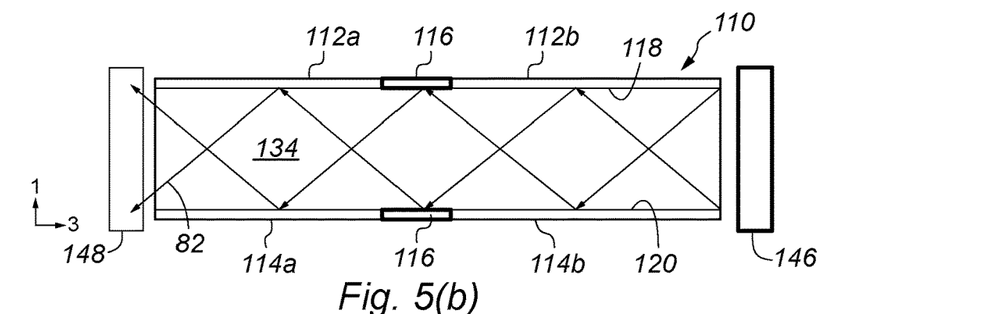

Reference is now made to FIGS. 5(a) and 5(b) which show an illustration of a laser 110, in (a) a plane orthogonal to the first axis and (b) a plane orthogonal to the second axis, according to an embodiment of the present invention. Like parts to those of FIG. 1 have been given the same reference numeral with the addition of 100 to aid clarity. Laser 110 has a channel waveguide with a localised metallic region 116 of length $L_M$, between two dielectric regions 112a, 112b, with lengths $L_{D1}$ and $L_{D2}$ respectively, on both the first and second surfaces 118,120. Together with third and fourth surfaces 134,136 a channel waveguide is formed between two resonator mirrors 146,148, a partially reflective output coupler 148 and a highly reflective rear mirror 146. The metallic region 16,116 may be formed in one surface only or two opposing surfaces to ensure polarisation selection. The metallic region 116 extends over the entire width of the waveguide to ensure all the light 82 passes the polarisation selecting region 116 but along the length by a distance governed by equation (3) below:

$$0.05 \leq \frac{L_M}{L_M + L_{D1} + L_{D2}} \leq 0.3 \quad (3)$$

The value of $L_M$ is empirically adjusted within the range governed by equation (3) to optimise polarisation and mode selection. The metallic region 116 can be placed in either or both first and second waveguide surfaces provided sufficient polarisation selection is generated without significant loss of mode selection. In a preferred embodiment, the metallic region 116 is placed in the first and second waveguide surfaces 118,120, the metallic section within each plate 112,114 equally sized and the two sections placed directly opposite each other. The metallic section 116 can be placed anywhere along the length of the waveguide therefore, in general, $L_{D1} \neq L_{D2}$. The metallic section 116 may be broken into several sections of shorter length $L_M$ to give the required total length along the propagation, third axis, required for polarisation selection. It is further noted that the metallic regions 116 could instead be located in the third 134 and/or fourth 136 surfaces as these are also guiding surfaces in a channel waveguide.

Figure 6A:
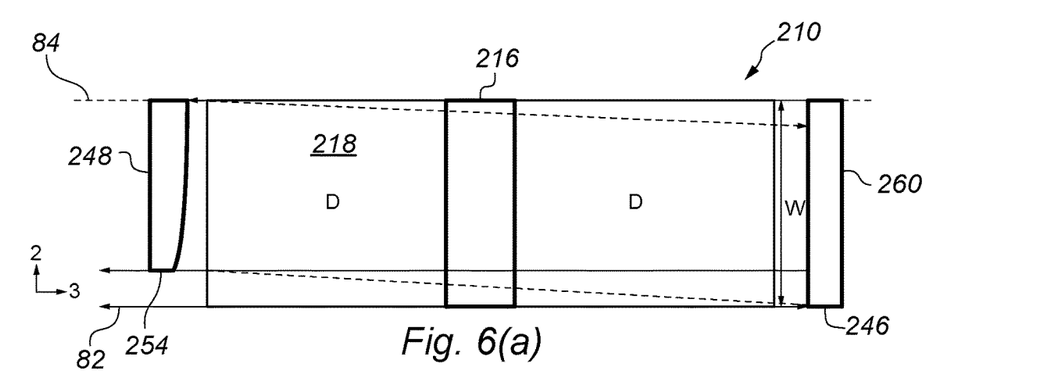
Figure 6B:
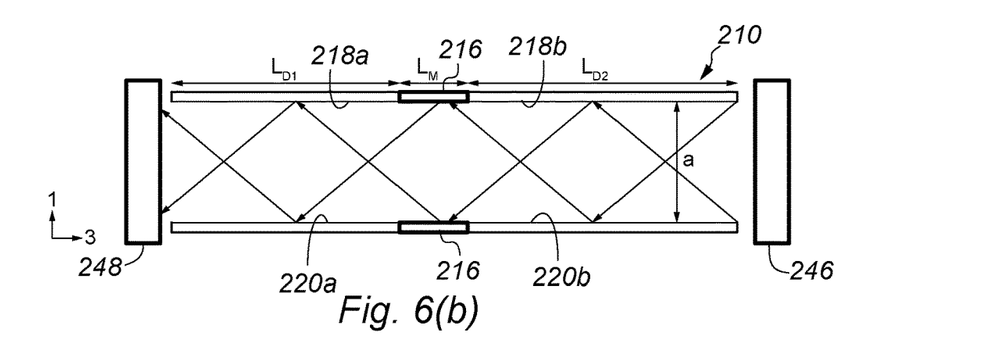

FIGS. 6(a) and 6(b) show illustrations of a laser 210, in (a) a plane orthogonal to the first axis and (b) a plane orthogonal to the second axis, according to an embodiment of the present invention. Like parts to those of FIG. 1 have been given the same reference numeral with the addition of 200 to aid clarity. Laser 210 has a resonant cavity 260 which is a positive branch unstable resonator formed around a planar waveguide. In a plan view FIG. 6(a), the light 82 initiated at the optical axis 84 reflects multiple times from the front and rear high reflectors 246,248, magnifying after each complete pass, until it exits the resonator 260 around the edge 254 of the output coupler 248. In the other axis, FIG. 6(b), the light 82 reflects from two waveguiding surfaces 218,220 formed from two dielectric sections, 218a, 218b,220a,220b, of lengths $L_{D1}$ and $L_{D2}$, and a metallic section, 216, of length $L_M$. The length $L_M$ is again determined empirically and adjusted within the range detailed in equation (3) to optimise polarisation and mode selection. The metallic section 216 extends the entire width, w, of the waveguide surfaces. Similar to the channel waveguide, the metallic section can be in either or both guiding surfaces, although ideally should be in both, located anywhere along the waveguide length and can be split into several smaller sections to give total length $L_M$ required for polarisation selection.

Figure 7A:
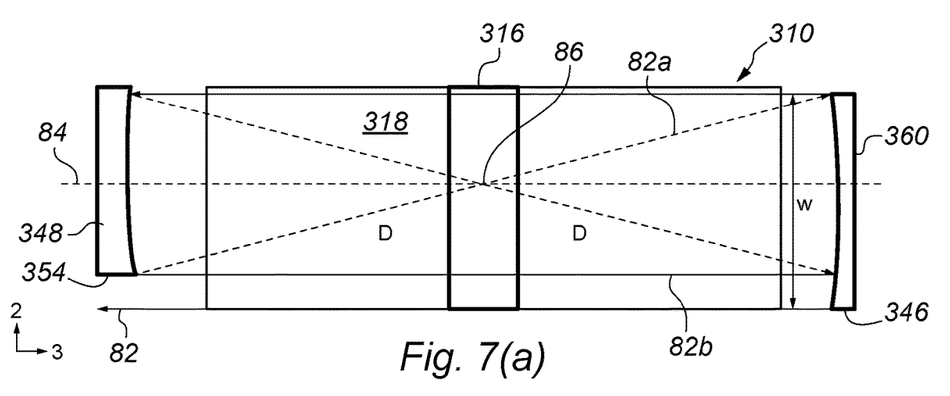
Figure 7B:
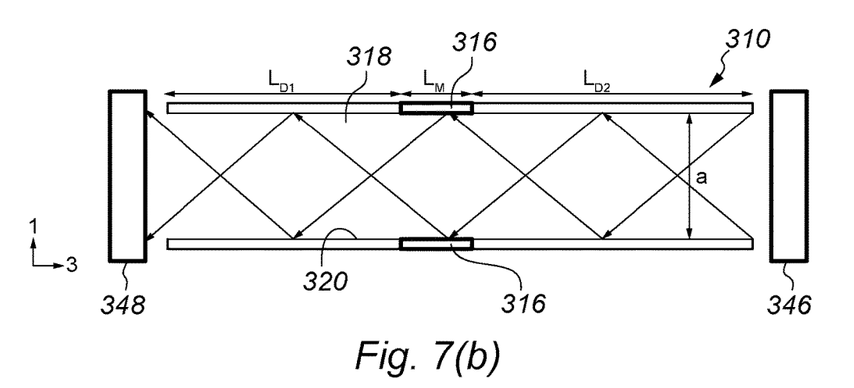

A preferred embodiment of a laser 310, is illustrated in FIG. 7(a), in a plane orthogonal to the first axis, and FIG. 7(b) in a plane orthogonal to the second axis. Like parts to those of FIG. 1 have been given the same reference numeral with the addition of 300 to aid clarity. Laser 310 has a resonant cavity 360 which is a negative branch unstable resonator formed around a planar waveguide. In a negative branch unstable resonator the light 82 initiates on the optical axis 84 and is magnified on each round trip before exiting the laser 310 around the edge 354 of the output coupler 348. However, unlike the positive branch resonator 260, the beam is focussed in the reverse direction, light 82a propagating towards the rear mirror 348, and is collimated in the forward direction, the light 82b propagating towards the output coupler 348. The metallic polarisation selecting region, 316, is designed to act upon all the oscillating light in both the forward and reverse directions. Therefore, the metallic region extends the entire width, w, of the waveguiding surfaces 318,320 and is located symmetrically about the intracavity focus, F, 86 of the light 82a propagating in the reverse direction. The location of the centre of the metallic region 316 is determined by equations (4) and (5) below:

$$L_{D1} = \frac{1}{2}(R_1 - L_M) \quad (4)$$

$$L_{D2} = \frac{1}{2}(R_2 - L_M) \quad (5)$$

Here $R_1$ is the radius of curvature of the output coupler 348 and $R_2$ is the radius of curvature of the rear mirror 346. The length of the metallic region is empirically determined to ensure the required polarisation and mode selection within the range determined from equation (3). The metallic section 316 will be located in both waveguide surfaces 318, 320.

Figure 8:
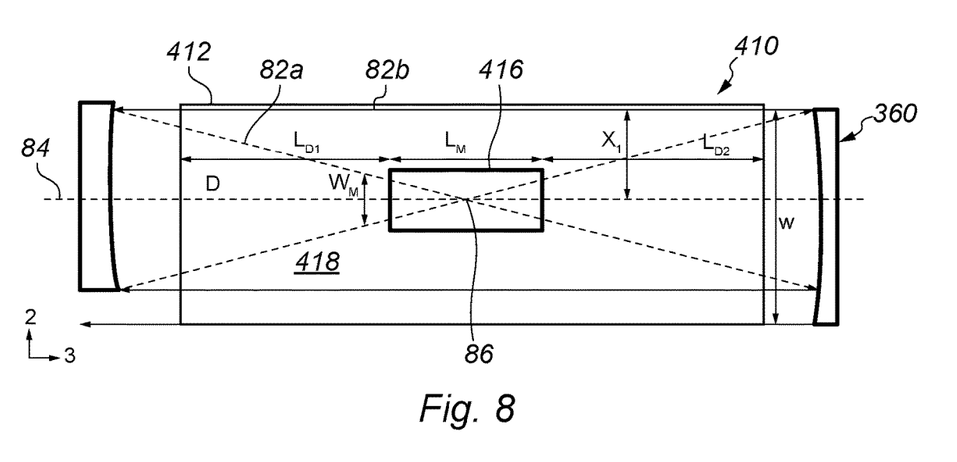
FIG. 8 is a schematic illustration of the laser of FIG. 7 with a smaller metallic region shown in a plane orthogonal to the first axis according to an embodiment of the present invention.

Referring to FIG. 8 there is illustrated a laser 410, according to a further embodiment of the present invention. Laser 410 has the same negative branch unstable resonator cavity 360 as FIGS. 7(a) and (b) around a planar waveguide. In this embodiment the metallic region 416 is a rectangular section bounded entirely by dielectric material on the first surface 418 of the plate 412. Unlike the embodiment of FIG. 7, the metallic region 416 only interacts with all the propagating light 82a in the reverse direction and so is considered unidirectional selection. In this case, the metallic region 416 does not extend over the entire width but is positioned symmetrically about the intracavity focus F, 86, and is sized to give the required polarisation and mode selection. Along the length of the waveguide the centre of the metallic section 416 is located according to equations (4) and (5) above. Along the width the centre of the metallic section is located according to equation (6):

$$x_1 = \frac{w}{1+m} \quad (6)$$

$$m = \frac{R_2}{R_1},$$

Here the magnification of the resonator cavity 360 and $x_1$ is the distance across the width w of the first surface 418.

The length of the metallic section 416, $L_M$, is empirically determined to provide the required polarisation and mode selection. The width of this region 416, $W_M$, is chosen to ensure all the light in the reverse direction travels through the metallic region and is determined from equation (7) below.

$$W_M = \frac{2L_M w}{R_1(1+m)} \quad (7)$$

An identical metallic section 416 is located in the same position on the second surface 420 of the plate 414 (not shown).

Figure 9:
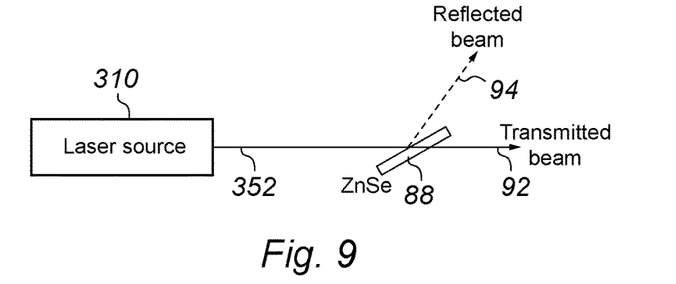
FIG. 9 is an experimental test set-up for measuring polarisation properties.

The polarisation selection of laser 310 was tested using the experimental arrangement of FIG. 9. The output beam 352 from the laser 310 was incident on a ZnSe plate 88 inclined so the angle of incidence is a few degrees from Brewster's angle. The reflectivity for p-polarised light is ~0.5%-1.0% whereas the reflectivity for s-polarised light is ~60%. The laser 310 was oriented so the TE modes have their polarisation oriented along the p-polarised direction with respect to the ZnSe plate 88. Therefore, any change in the polarisation results in a significant change in the reflected beam 94 compared with the transmitted beam 92.

Figure 10A:
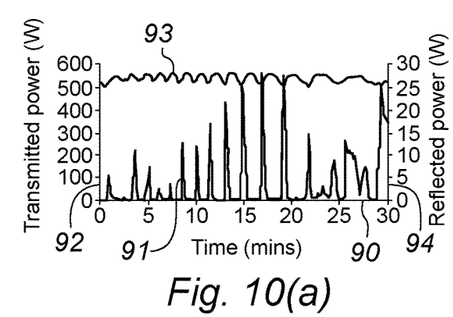
Figure 10B:
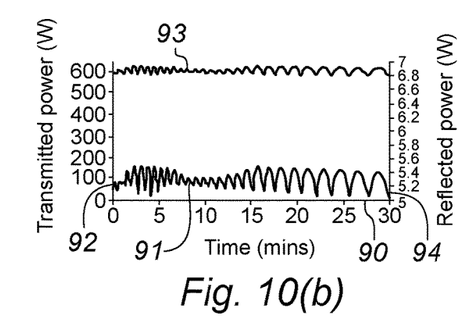

FIGS. 10(a) and 10(b) display experimental results for transmitted power 92 and reflected power 94 versus time 90 for the laser 310 with (a) no polarisation selecting metallic region present and (b) a polarisation selecting region 316 being present. With no polarisation selecting region there are clear spikes in the reflected signal 91 as the polarisation changes state. However, after the introduction of the polarisation selecting metallic region 316 the reflected signal 91 is a directly scaled replica of the transmitted signal 93 indicating a polarisation purity of >100:1 for the TE mode compared with the TM mode.

Figure 11A:
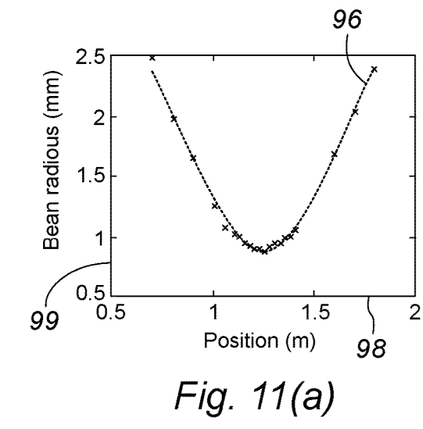
Figure 11B:
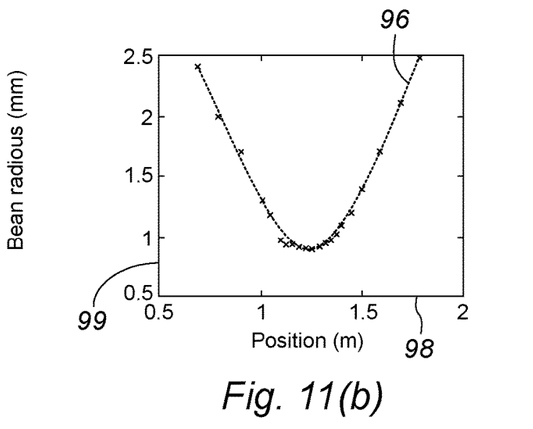

The mode selectivity of the laser 310 incorporating the metallic region 316 was tested by measuring the beam radius through the focus of a 1.3 m lens in two orthogonal planes, the waveguide and the free-space axes. The results are shown in FIG. 11 which is a graph 96 of beam radius 99 along (a) the second or free-space axis and (b) the first axis or waveguiding axis against position 98. In both directions the $M^2=1.05$ which clearly demonstrates mode selectivity to the lowest or fundamental mode. Thus high polarisation purity and high mode quality are possible simultaneously with a laser according to the present invention.

Figure 12A:
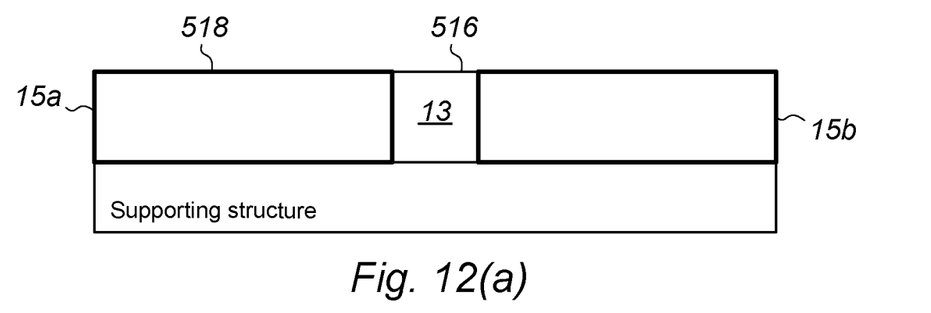
Figure 12B:
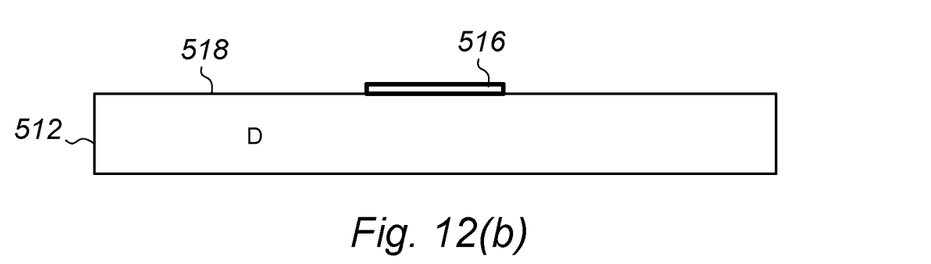
Figure 12C:
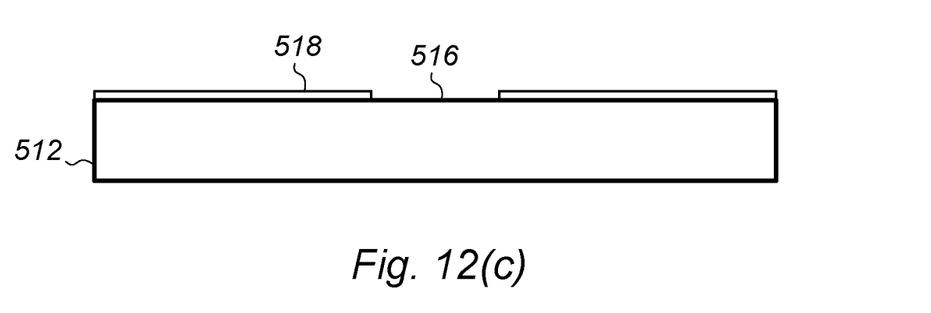

Now referring to FIGS. 12(*a*)-(*c*) there is illustrated methods of incorporating a metallic region 516 into a substantially dielectric surface 518 to provide the desired mode and polarisation selection according to embodiments of the present invention. In FIG. 12(*a*) a machined metallic block 13 is inserted into a machined ceramic component 15. The machined ceramic component 15 can comprise two individual machined ceramic blocks 15*a*,15*b* with the metallic block 13 sandwiched there between. The metallic block 13 directly abuts the ceramic blocks 15*a*,15*b* and there is no gap between so that a continuous surface 518 is provided for waveguiding. This arrangement can be arranged on a supporting structure which could be either metallic or a dielectric. If dielectric then a single dielectric block 15 could be machined to provide a groove or recess into which the metallic block 13 is located. In FIG. 12(*b*), the localised metallic region 516 is applied as a metallic coating on a surface 518 of a ceramic plate 512. The coating is several microns thick to provide sufficient polarisation selectivity while still providing a substantially planar surface 518 for waveguiding. The coating is applied over an area of the dielectric surface as calculated above. FIG. 12(*c*) shows an alternative embodiment where a metallic substrate is used to form the plate 512. A mask is then applied which covers the region 516. A dielectric coating of a few microns thickness is then applied over the surface of the metallic substrate. With the mask removed, bare metal is exposed to the oscillating light, providing the metallic region 516 on a substantially dielectric surface 518. While the metallic region 516 is shown to be rectangular in surface area, it will be understood that the metallic region could form any shape and rectangular is selected only for simplicity of construction and to ensure the light passes over the region.

The principal advantage of the present invention is that it provides a laser with combined polarisation and mode selection.

A further advantage of the present invention is that it provides a laser with low order mode and linear polarisation from a channel or planar waveguide without additional optics.

It is a yet further advantage of the present invention is that it provides a method of producing a polarisation and mode selective laser which is relatively simple and can be implemented at relatively low cost.

Modifications may be made to the invention herein described without departing from the scope thereof. For example, the metallic region may form any shape and could be shaped to ideally match the beam waist or form at the position of the region. The region can be arranged at any position on the propagation axis. While the present invention is described with reference to a $CO_2$ waveguide laser, the invention will find application in other lasers of other gas discharge, solid state material, semiconductor material or liquid dye types.

We claim:

1. A polarisation and mode selective laser comprising first and second surfaces separated to form a waveguide on a first axis between said surfaces; a discharge region contained within at least a portion of said waveguide; a resonant cavity having a propagation axis orthogonal to said first axis; and characterised in that the first surface is a substantially dielectric surface including a localised metallic region therein, providing thereby a metallic surface and a dielectric surface, the area of the surface of the dielectric surface being greater than the area of the surface of the metallic surface, the metallic surface arranged on said first surface so as to provide sufficient polarisation selection by said laser.

2. A polarisation and mode selective laser according to claim 1 wherein the metallic region has a length in the propagation axis between 5% and 30% of a length of the first surface along the propagation axis.

3. A polarisation and mode selective laser according to claim 2 wherein the length of the metallic region LM is governed by the equation:

$$0.05 \leq \frac{L_M}{L_M + L_{D1} + L_{D2}} \leq 0.3$$

and $L_{D1}$ is a length of dielectric surface on a first side of the metallic region and $L_{D2}$ is a length of dielectric surface on a second side of the metallic region such that $L_M+L_{D1}+L_{D2}$ is the length of the first surface along the propagation axis and $L_{D1}=L_{D2}$.

4. A laser according to claim 2 wherein the length of the metallic region LM is governed by the equation:

$$0.05 \leq \frac{L_M}{L_M + L_{D1} + L_{D2}} \leq 0.3$$

and $L_{D1}$ is a length of dielectric surface on a first side of the metallic region and $L_{D2}$ is a length of dielectric surface on a second side of the metallic region such that $L_M+L_{D1}+L_{D2}$ is the length of the first surface along the propagation axis and $L_{D1} \neq L_{D2}$.

5. A polarisation and mode selective laser according to claim 2 wherein the metallic region comprises a plurality of sections which provide an overall desired length along the propagation axis.

6. A polarisation and mode selective laser according to claim 1 wherein the metallic region extends over an entire width of the first surface along a second axis orthogonal to the first and propagation axes.

7. A polarisation and mode selective laser according to claim 1 wherein the metallic region is located symmetrically about a focus of the resonator cavity.

8. A polarisation and mode selective laser according to claim 1 wherein the metallic region is rectangular in shape on the first surface.

9. A polarisation and mode selective laser according to claim 1 wherein there is a metallic region in the second surface.

10. A polarisation and mode selective laser according to claim 9 wherein the metallic regions in the first and second surfaces are the same size and shape, and arranged to lie directly opposite each other in the laser.

11. A laser according to claim 1 wherein the resonant cavity comprises two resonator mirrors being a highly reflective rear mirror and an output coupler arranged as a positive branch unstable resonator around a planar waveguide.

12. A laser according to claim 1 wherein the resonant cavity comprises two resonator mirrors being a highly reflective rear mirror and an output coupler arranged as a negative branch unstable resonator arranged around a planar waveguide.

13. A polarisation and mode selective laser according to claim 1 wherein the discharge is an RF excited $CO_2$ laser gas.

14. A method of providing a polarisation and mode selective laser, comprising the steps:
   a) providing first and second surfaces which can be arranged to form a waveguide therebetween;
   b) providing a resonant cavity around said waveguide;
   c) creating a gas discharge within at least a portion of said waveguide; characterised in that:
   the first surface comprises a substantially dielectric surface including a localised metallic region therein providing a metallic surface in a greater area of dielectric surface, providing thereby a metallic surface and a dielectric surface, the area of the surface of the dielectric surface being greater than the area of the surface of the metallic surface, the metallic surface arranged on said first surface so as to provide sufficient polarisation selection by said laser.

15. A method of providing a polarisation and mode selective laser according to claim 14 wherein the method includes the step of inserting a machined metallic element into a machined ceramic element to provide the first surface.

16. A method of providing a polarisation and mode selective laser according to claim 14 wherein the method includes the step of inserting a machined metallic element between two machined ceramic elements to provide the first surface.

17. A method of providing a polarisation and mode selective laser according to claim 14 wherein the method includes the step of placing a metallic coating in a region on a surface of a ceramic substrate to provide the first surface.

18. A method of providing a polarisation and mode selective laser according to claim 14 wherein the method includes the step of placing a dielectric coating on a metallic substrate wherein a region of the metallic substrate includes a mask to prevent coating in the region of the mask.

* * * * *